United States Patent [19]

Heyman et al.

[11] 4,327,283

[45] Apr. 27, 1982

[54] WORKPIECE WITH MACHINE-READABLE MARKING RECESSED THEREIN AND METHOD OF MAKING SAME

[75] Inventors: Philip M. Heyman, Robbinsville; Robert L. Quinn, Trenton, both of N.J.

[73] Assignee: RCA Corporation, New York, N.Y.

[21] Appl. No.: 78,440

[22] Filed: Sep. 24, 1979

[51] Int. Cl.$^3$ ............................................. G06K 19/02

[52] U.S. Cl. .................................... 235/487; 235/488

[58] Field of Search ............... 235/488, 487, 454, 462; 250/455, 466, 468, 469; 346/75, 21

[56] References Cited

U.S. PATENT DOCUMENTS

| | | | |
|---|---|---|---|
| 3,702,585 | 11/1972 | Landis | 101/1 |
| 3,726,212 | 4/1973 | Combs | 101/21 |
| 3,736,406 | 5/1973 | Vossen | 219/216 |
| 3,761,725 | 9/1973 | Meyer | 235/462 |
| 3,792,238 | 2/1974 | Samoel | 235/473 |
| 3,820,456 | 6/1974 | Wolfheimer | 101/93 MN |
| 3,839,644 | 10/1974 | Fulton | 307/117 |
| 3,903,526 | 9/1975 | Cotter | 346/21 |
| 4,038,524 | 7/1977 | Puech et al. | 235/488 |
| 4,085,314 | 4/1978 | Schultz et al. | 235/488 |

FOREIGN PATENT DOCUMENTS

| | | |
|---|---|---|
| 2513890 | 11/1978 | Fed. Rep. of Germany . |
| 1326775 | 8/1973 | United Kingdom . |
| 1381527 | 1/1975 | United Kingdom . |

*Primary Examiner*—Robert M. Kilgore

*Attorney, Agent, or Firm*—E. M. Whitacre; G. H. Bruestle; L. Greenspan

[57] ABSTRACT

A workpiece having a machine-readable coded marking recessed into the surface thereof. The workpiece comprises a main body and a thin integral coating in the area of the marking. The marking comprises a plurality of related marks, such as a bar-code marking, which are recessed through the coating and which have substantially different light reflectances than the surrounding surface. The workpiece may include an integral undercoating between the coating and the main body with marks recessed into, but not through, the undercoating. The marks may be made by selectively removing material, as by abrasion or ablation, from defined surface areas and through the coating.

8 Claims, 3 Drawing Figures

WORKPIECE WITH MACHINE-READABLE MARKING RECESSED THEREIN AND METHOD OF MAKING SAME

BACKGROUND OF THE INVENTION

This invention relates to a novel coated workpiece having a machine-readable marking recessed therein, and to a novel method for making said workpiece.

U.S. patent application Ser. No. 041,091 filed May 21, 1979 by W. R. Miller describes an improved method for assembling parts for a cathode-ray tube including providing at least one tube part, such as the glass faceplate, which has a unique machine-readable coded marking, such as a bar-code marking, on an external surface thereof. This marking is read one or more times by machine during the manufacturing of the tube. Each time it is read, a control signal is generated in response to the reading, and then the signal is used to initiate a local process for action with respect to the tube part. The local process may be one or more of selecting and assembling another part to the workpiece, a series of processing steps applied to the workpiece, a recording of a historical record, etc. The marking must be made reliably at low cost, must be readable reliably at low cost and must survive the hostile environments of subsequent processing.

U.S. patent application Ser. No. 041,092 filed May 21, 1979 by P. M. Heyman discloses an improved workpiece which carries a machine-readable coded marking, such as a bar-code marking abraded into the surface of the workpiece. Also disclosed is a novel method whereby the abraded marking can be made on demand at relatively low cost and at relatively high rates of speed. Since the marking is abraded into the workpiece, it has substantially the same resistance to hostile environments as the workpiece itself. The abraded portions of the marking and the nonabraded portions therebetween have substantially different reflectances so that they can be read with commercial bar-code readers at low cost. The difference in reflectances is the difference in the reflectance of abraded areas, which are relatively more light scattering, and nonabraded areas, which are relatively less light scattering. It is desirable to provide a still higher difference in reflectances for each marking and a difference which is not dependent solely on the light-scattering qualities of the abraded and nonabraded portions of the marking.

SUMMARY OF THE INVENTION

The invention includes a novel workpiece, which may be of glass, having a machine-readable coded marking recessed into a surface thereof. The workpiece comprises a main body and a thin integral coating in the area of the marking. By integral is meant that the coating and body are inseparable parts of a single article. The marking comprises a plurality of related marks, such as a bar-code marking, which are recessed through the coating and which have substantially different light reflectances from the nonrecessed surfaces therebetween. In a preferred embodiment, the workpiece includes a coating and an undercoating, and the marks are recessed into, but not through, the undercoating. Such a marking satisfies all the above-mentioned desired characteristics. In addition, the difference in reflectances between the marks and the surfaces therebetween is principally the result of the choice of the various materials involved. The materials comprising the coating and the undercoating can be tailored for a desired reading system.

The invention includes also a novel method for producing a machine-readable marking in a surface of a rigid workpiece. The novel method comprises (a) providing a workpiece comprising a main body and a thin surface coating integral with the main body, and then (b) selectively removing material from defined areas of the surface and through the coating, thereby producing a plurality of related marks recessed into the surface of the workpiece and having substantially different reflectances from the nonrecessed surfaces therebetween. Where there is an undercoating present, material may also be removed from, but not through, the undercoating. Material may be removed from the coating, and the undercoating where it is present and desired, by e.g., abrasion as by impacting abrasive particles traveling at high velocity on selected areas of the surface, or by ablation as by irradiating the selected areas with a laser beam of suitable power density.

DETAILED DESCRIPTION

Figure 1:
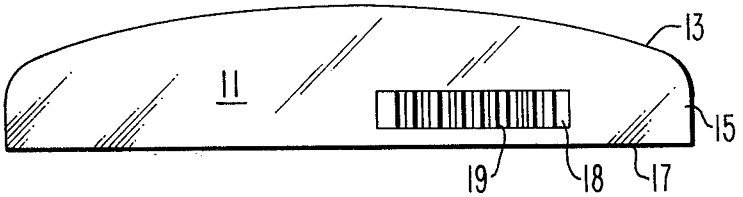
FIG. 1 is an elevational view of one embodiment of the novel workpiece.

FIG. 1 is a typical glass faceplate panel 11 to be used as part of the envelope of a color television picture tube. The panel 11 includes a rectangular viewing window 13 and an integral sidewall 15 around the window 13. The sidewall 15 has a panel seal land 17 at the distal end thereof. A thin integral panel coating 18 of a light-reflecting material is located on the external side of the sidewall 15 in the area of interest. A machine-readable coded marking 19 is indented, e.g., abraded, through the panel coating 18. The marking 19 comprises a related sequence of substantially parallel bars or stripes of predetermined widths and spacings, which are popularly referred to as a bar-code marking. Any of the codes used for bar-code marking may be used on the panel 11. In this specific embodiment, the marking 19 uses the interleaved two-of-five code which employs abraded bars of one-unit and three-unit widths and nonabraded spaces therebetween of one-unit and three-unit widths. Since bar codes are described in detail elsewhere, no further description of the code itself is necessary.

Figure 2:
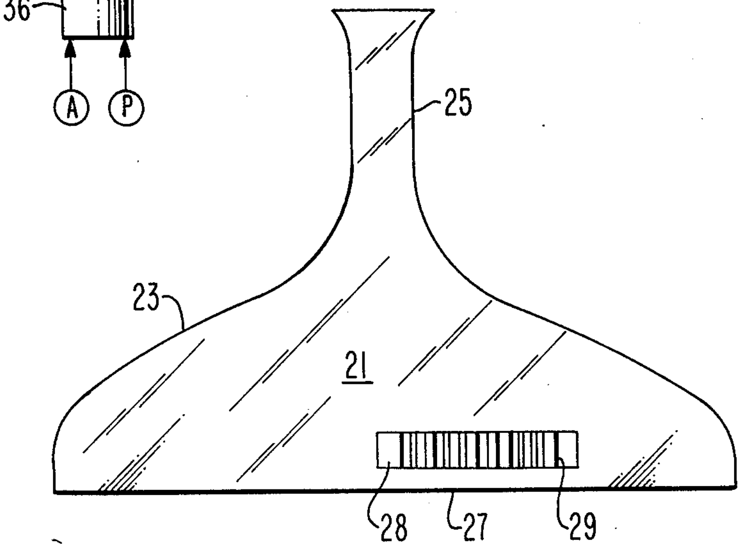
FIG. 2 is an elevational view of another embodiment of the novel workpiece.

FIG. 2 is a typical glass funnel 21 to be used as part of the envelope of a color television picture tube. The funnel includes a cone 23, a neck 25 integral with the narrow end of the cone 23 and a funnel seal land 27 at the wide end of the cone 23. A thin integral funnel coating 28 of a light-reflecting material is located on the external surface of the cone in the area of interest. A machine-readable coded marking 29 as described above for the panel 11 is abraded through the funnel coating 28.

In both FIGS. 1 and 2, the coatings 18 and 28 and the markings 19 and 29 may be placed anywhere on the workpieces. However, for making and reading the markings automatically by machine, it is important that the markings be placed at locations that are easily located and accessed. As shown in FIG. 1, the panel marking 19 and the marks thereof are about 19 mm (0.75 inch) high and about 76.2 mm (3.00 inches) wide. The closest edge of the panel marking 19 is about 19 mm (0.75 inch) away from the seal land 17 with the bars of the marking 19 extending in a direction about normal to the surface of the seal land 17. The abraded marks are either about 0.6 mm (0.025 inch) or about 1.9 mm (0.075 inch) wide. The marking 19 includes a central portion with specific identifying information, typically about 63.5 mm (2.50 inches) wide, and end portions about 6.3 mm (0.25 inch) wide at each end of the central portion for signalling a machine reader the "start" and the "stop" of the marking. The panel coating 18 is slightly wider than the panel marking 19, providing a border about 0.6 mm wide at each end of the panel marking 19. The funnel marking 29 on the funnel 21 shown in FIG. 2 is similar to the above-described panel marking 19 and is located about 19 mm (0.75 inch) from the funnel seal land 27. During subsequent processing, the panel 11 and the funnel 21 may be joined together at their respective seal lands by methods known in the art. The coatings 18 and 28 and the markings 19 and 29 are not degraded during the common frit-sealing method which employs temperatures of more than 400° C.

In addition to light-reflecting ability, the following characteristics in the panel and funnel coatings 18 and 28 are desirable:

(1) effective scatterer and depolarizer of light,
(2) resistant to temperatures to at least 450° C.,
(3) chemically resistant to chemicals as used in processing of kinescopes,
(4) mechanically resistant to the abrasions and impacts typical of kinescope handling during manufacture,
(5) ability to be removed cleanly by an abrasive or ablative process, and
(6) aesthetic appeal.

A light-reflecting coating may be applied to the glass in any one of several ways depending on the nature of the coating. Application methods that have been used successfully are spraying and screening. Rolling may be used if the surface of the glass is not overly rough. The coating may be applied in the form of a prescreened decal or other printing transfer. The application method chosen should produce a layer that is as uniform in thickness as possible, since the clarity of the readout from the label usually is better when the layer has a substantially constant thickness. The coating, which is typically about 0.13 mm (0.5 mil) thick, should be thick enough to have the required optical characteristics but not so thick as to tend to crack or flake.

After applying the coating, the marks are recessed through it, as by abrasion or ablation to expose a contrasting material. Then, the coating is heated or fired so as to fuse the coating to the workpiece to make it integral with the main body of the workpiece and to increase its chemical durability. Alternatively the coating may be heated or fired to make it integral with the body and then the marks are recessed therein. However, abrading a fired coating is more difficult than abrading the coating before firing. Heating or firing has the effect of integrating the coating with the main body. By this is meant that the coating and the body become essentially inseparable parts of a single article, and the coating cannot be removed from the body without destroying the coating. This is to be distinguished from a pigmented layer that is held to the body with an intermediate film of adhesive which can be softened and the layer released. It is preferred to use a coating including an inorganic silicate with a main body of glass whereby, upon suitable heating or firing, the silicates of the coating and the body integrate with one another.

Materials that can be used for the light-reflecting coating include pigmented frits, pigmented potassium silicate, pigmented sodium silicate and high-temperature paints. In both the frit-type and the alkali silicate-type coatings, a pigment that may be used is $TiO_2$ (titanium dioxide). Formulations that have been successfully employed are:

(1) for spraying
- (a) 5.0 gm. #1011 Screen Paste, Vitta Corporation, Norwalk, Conn.
  10 ml. $\frac{1}{4}$ sec. nitrocellulose solution, where the nitrocellulose solution is made up of 10 gms. wet $\frac{1}{4}$ sec. in 30% isopropanol and 100 gms. amyl acetate
  1 gm. $TiO_2$ ($0.3\mu$ mean particle size)
- (b) 3.5 gm. #7575 Frit (400 mesh), Corning Glass Works, Corning, N.Y.
  1.5 gm. $TiO_2$ ($0.3\mu$ mean particle size)
  15 ml. of above nitrocellulose solution
- (c) 3.5 gm. #7575 frit (400 mesh), Corning Glass Works, Corning, N.Y.
  1.5 gm. $TiO_2$ ($0.3\mu$ mean particle size)
  15 ml. of a 1:2 polyalpha methyl styrene in amyl acetate by weight diluted 6:33 with additional amyl acetate
- (d) 20 ml. of a slurry 1:2 by weight of $TiO_2$ ($0.3\mu$ mean particle size) in distilled water
  3 ml. of 10 weight percent potassium silicate
  7 ml. distilled water (2) for screening
  8 gm. #1011 screening paste, Vitta Corporation, Norwalk, Conn.
  1 gm. $TiO_2$ powder ($0.3\mu$ mean particle size).

Both the pigmented frit coating and the pigmented potassium-silicate coating are ideal for being marked by sandblasting because, when applied, they are in the "green" state, which allows them to be easily abraded. However, once they are fired, they become very much more resistant to removal by mechanical or chemical means.

To further increase the ruggedness of both types of coatings, a thin over coating of unpigmented alkali silicate may be applied over the abraded bar-code pattern. Typically, a clear spray consisting essentially of a 10 weight percent potassium silicate solution diluted with about 3 parts of distilled water may be applied and then dried.

In certain cases, it is advantageous to construct the coating of two integral layers that have opposite optical characteristics (i.e., one is white and scattering or reflecting and the other is black and absorbing). The parameters of the coating-sandblast system are adjusted so that the abrasive penetrates completely through the coating and just penetrates into the undercoating, which is closer to the glass body. If the layers are arranged so that the black (absorbing) layer is sandwiched between the white (scattering) layer and the glass, then the abraded marking has the same polarity as a marking with no black undercoating layer. An advantage of this approach is that the black undercoating layer optically isolates the optical reader from any interfering reflections that may arise from behind the undercoating layer. Another advantage of the black undercoating layer is that a marking applied on a clear glass panel sidewall is rendered somewhat less visible to persons who view the kinescope in the "push-through" mode of mounting;

that is, the black layer optically isolates the glass body from the marking. One formulation for a black undercoating is:

5 gms. $MnO_2$ (manganese dioxide)
5 ml. potassium silicate solution
15 ml. distilled water.

To coat this black undercoating, the following white coating may be applied:

6 gms. $TiO_2$
2 ml. potassium silicate solution
25 ml. distilled water.

In this application, it is desirable to have the black undercoating be very tough so that it is unlikely that the abrasive stream penetrates the entire undercoating thickness while the upper, white coating is being removed.

It should be noted that marks can also be recessed into the integral coating by a focused beam of electromagnetic radiation, such as a beam that may be emitted by a laser apparatus.

The panel 11 (FIG. 1) and the funnel 21 (FIG. 2) are typical workpieces comprising an integral coating included within the invention. Also, included within the invention are other workpieces or combinations of workpieces and/or other materials or combinations of materials. For example, many metals such as aluminum, steel, stainless steel, copper, brass, etc. are markable by the novel method, although the integral coating may have to be tailored for the body. The marking in the novel article is recessed into the integrally-coated surface of the workpiece. Thus, the marking has substantially the same characteristics to the ambient as the integral coating itself. Being integral with the main body of the workpiece, there is no intermediate adhesive film present between the body and the coating which could limit the utility of the marking.

The recessed areas of the marking have a different reflecting characteristic from the nonrecessed areas therebetween. In vitreous bodies, such as glass, the marks of the markings appear as areas of lesser reflectivity because the abrasion removes areas of the coating which have greater reflectivity. In metal bodies, the recessed areas have increased light absorption and therefore appear darker than the nonrecessed areas. These markings may be read by detecting the differences in reflectivity between the marks and the surfaces therebetween in the specular angle. It is this difference which allows the marking to be read by a process including optically detecting the light reflection or the light scattering from the marked surface. Two devices that may be used to detect these markings are a laser scanner and a television camera. With a laser scanner, a light beam is scanned across the marked surface whereby the reflected light is modulated by the occurrence of recessed or nonrecessed areas. With a television camera, either ambient light or a fixed light source provides the required illumination to activate the photosensitive surfaces in relation to the recessed or nonrecessed areas of the marking.

The marks may be recessed into the workpiece by etching, or ablation, or by any other method for selectively removing material from a surface. Abrading is to be distinguished from cutting, incising and engraving, which involve putting sharply-defined grooves in the surface, which grooves may weaken the workpiece when it is stressed. Etching is not desirable because it requires a chemical reaction which is slow and is difficult to work with. Abrading, which involves mechanical action principally, can be carried out with abrasive particles transported at high velocity in a gas, or a liquid or a solid. Abrading does not cut sharply-defined grooves in the surface and can produce markings reliably at low cost by machine. Ablation can be carried out with a scanned or shaped laser beam of suitable powder density. Where a coating and undercoating are used, the undercoating can be used to provide a buffer layer so that the coating can be completely removed by the novel method without having the beam impinge upon glass body. This buffer layer then may prevent stresses from being set up in the glass body that can lead to premature failure of the product when later subjected to normal usage.

Markings such as are shown at 19 (FIG. 1) and 29 (FIG. 2) can be produced by any suitable abrading process and with any abrading apparatus that can suitably define and locate the marks of the marking. A preformed template or stencil on the surface of the workpiece to define all of the marks of the marking simultaneously, in combination with a means to abrade the exposed surface with a blast of abrasive particles, may be used, but it is slow, cumbersome and expensive.

Figure 3:
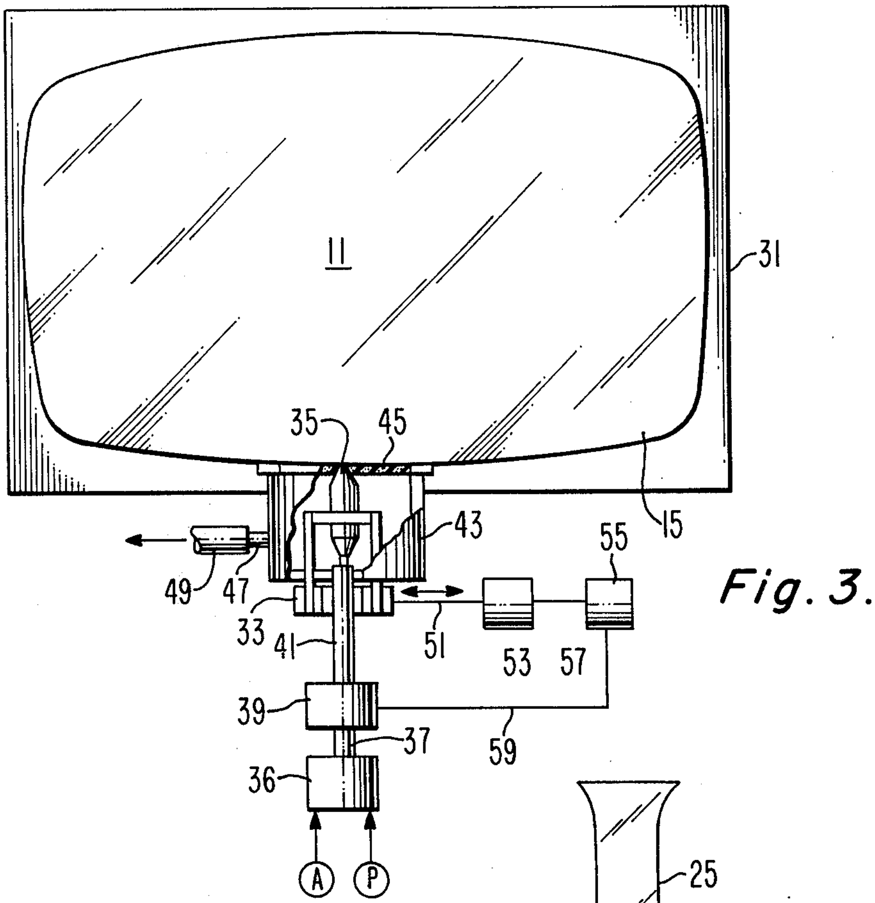
FIG. 3 is a broken-away plan view of an apparatus for practicing the novel method.

FIG. 3 shows an apparatus in which a marking can be made rapidly and cheaply on demand by producing the marks sequentially. The apparatus, which is disclosed in the Heyman patent application op. cit., comprises a workpiece table 31 and a stage 33 which can be moved one with respect to the other. The table 31 is stationary, and the stage 33 is adapted for controlled translational movement with respect to the table. The panel 11 of FIG. 1, shown from above, is positioned on the table 31 with the seal land 17 against the table surface and the window 13 facing upwardly. A nozzle 35 is mechanically connected to the stage 33 so that the nozzle 35 moves with the stage 33. The output end of the nozzle 35 is closely spaced from the sidewall 15 of the panel 11 in the area of interest for marking.

There is a wide variety of grit sizes and abrasive materials from which optimums for a given application can be chosen. Consideration must be given to the hardness of the surface, the time allowed for the process, the wear and tear on the equipment, the amount of material to be removed and the resolution of the desired pattern. For abrading bar codes, with about 0.63 mm (0.025 inch) minimum bar widths, it is desirable that the edge roughness of each bar is about 0.05 mm (0.002 inch) or less. This can usually be achieved with particles rated at 27 micron grit. Particulate aluminum oxide, $Al_2O_3$, is preferred because it is capable of quickly abrading glass while producing only moderate wear of the equipment.

The inlet end of the nozzle is a tube or neck supplied with an air-and-abrasive mixture. Air from a source A and abrasive particles from a source P are combined in a mixer 36. The mixture is passed through a first hose 37, then through a control valve 39 capable of turning the stream of air and abrasive off or on, then through a second hose 41 to the input end of the nozzle 35. A dust hood 43 encloses the nozzle 35. The dust hood includes a dust seal 45 adjacent the sidewall 15 and a means 47 for exhausting the inside of the hood 43 to the suction hose 49. The stage 33 is connected by a mechanical linkage 51 to a translator means 53 for moving the stage 33 in a direction that is substantially parallel to the surface of the table 31 and to the sidewall 15. The translator 53 may move the stage stepwise or continuously, as desired. Both the translator 53 and the mixing valve 39 are controlled simultaneously from an electronic controller 55 through electric connections 57 and 59 respectively.

The nozzle 35 comprises a body which is conical at the inlet end and chisel shaped at the outlet end. A core is located inside the body. The inner wall of the body and grooves in the core are so shaped as to provide channels for conducting the air-abrasive mixture around the core, converting the circular stream of air and abrasive to a line-shaped stream at the outlet orifice. The abrasive particles in the stream are substantially evenly distributed across the outlet orifice of the nozzle. In this embodiment, the outlet orifice is about 19 mm (0.75 inch) high and about 0.5 mm (0.020 inch) wide. The outlet orifice defines the height and width of the narrowest bar to be abraded into the workpiece. With proper manipulation, bar-shaped marks of single and triple widths and single and triple spacings can be made serially without the use of a template or stencil for making the marking.

In operation, the outlet orifice of the nozzle is spaced about 0.76 to 1.27 mm (0.030 to 0.050 inch) from the surface to be marked. The spacing is determined by the trade-off of two requirements. The first requirement is to have enough gap between the nozzle and the workpiece so that the spent air and abrasive can be exhausted without producing significant back pressure at the outlet orifice. The second requirement is to have the nozzle close enough to the work surface so that the emerging stream is not overly widened before impinging upon that surface. Optimal spacing will also depend in part on several parameters including nozzle design, delivery pressure and abrasive flow rate. The nozzle orifice is oriented with its height normal to the surface of the table 31 and positioned at one end of the desired marking area. On command from the controller 55, the stage 33 is advanced stepwise by the translator 53, which moves the nozzle 35 stepwise with respect to the sidewall 15 linearly from one end of the desired marking to the other. Simultaneously, the air-and-abrasive stream is turned on or off as required to produce the desired marking. If the nozzle motion is expressed as units which are equal to the minimum bar width, which is also the minimum space width, then, to obtain bar widths (abraded areas) of one-unit and three-unit widths, the air-and-abrasive stream is on, that is, the valve 39 is open, for effectively zero or two-unit widths respectively. To obtain spaces (nonabraded areas) of one- and three-unit widths, then the air-and-abrasive stream is off, that is, the valve 39 is closed, for two- and four-unit widths. In this embodiment, the stage 33 is moved by the translator 53 in steps which are about one-fiftieth of a unit width. Such step-wise motion may be said to approximate continuous motion.

By providing automatic workpiece loading and unloading means for the table 31 and an electronically programmed controller 55, markings can be made easily, reliably and cheaply on successive workpieces. To increase the marking rate, n nozzles may be used simultaneously, each nozzle having its own air and abrasive supply and control valve. Each nozzle is independently sprung. The n nozzles translate along the marking width d as a unit, with each nozzle being separated from its nearest neighbor by a distance d/n. Thus, each nozzle-and-control valve assembly is responsible for abrading only 1/n of the entire marking.

The markings may be read with a commercially-available reader at intervals during and after the assembly of the workpiece into an assembled end product. A typical reader is described in U.S. Pat. No. 3,801,182 to P. W. Jones in which a polarized light beam scans across the marking in a direction normal to the length of the bars. The reflected light is sensed and converted to electrical signals representative of the marking, which signals are then decoded and used for some useful purpose, such as the control of a manufacturing process or the compilation of historical data.

We claim:

1. A workpiece comprising a main body, a thin coating on a portion of said body, and an undercoating between, and in direct contact with, said coating and said main body, said coating and said undercoating being integral with said main body, said coating having an external surface and a coded machine-readable marking in said external surface, said marking comprising a related sequence of substantially parallel bars of at least two different widths recessed into said surface and through said coating, and separated by substantially parallel spacings, said bars and the surrounding surface having substantially different light reflectances.

2. The workpiece defined in claim 1 wherein said body is of glass, said coating includes an alkali silicate and a pigment.

3. The workpiece defined in claim 1 wherein said coating and said undercoating have substantially different light reflectances.

4. The workpiece defined in claim 3 wherein said coating is white and said undercoating is black.

5. The workpiece defined in claim 1 wherein each bar is recessed into, but not through, said undercoating.

6. A method for producing a machine-readable coded marking in a surface of a rigid workpiece, said marking comprising a related sequence of substantially parallel bars of at least two different widths separated by parallel spacings, said method including (a) providing a workpiece comprising a main body, a thin surface coating on a portion of said body and an undercoating between, and in direct contact with, said coating and aid main body, (b) sequentially targettng a series of contiguous substantially parallel stri-like areas of unit widths on said coating, said seies of areas being located along a linear path in th direction of the widths of said areas, (c) and removing all of the coating material from each of selected ones of said targetted areas entirely through sad coating according to a prearranged program related to said marking, some of said selected areas being contiguous, thereby producing a plurality of related marks recessed into said surface, said marks and the surrounding surface having substantially different light reflectances.

7. The method defined in claim 6 wherein said material is removed by abrasion.

8. The method defined in claim 6 wherein said material is removed by ablation.

* * * * *

UNITED STATES PATENT AND TRADEMARK OFFICE
CERTIFICATE OF CORRECTION

PATENT NO. : 4,327,283

DATED : April 27, 1982

INVENTOR(S) : Philip Michael Heyman and Robert Leon Quinn

It is certified that error appears in the above-identified patent and that said Letters Patent is hereby corrected as shown below:

| | |
|---|---|
| Column 4, line 14 | Delete "1/4 sec." |
| Column 4, line 15 | After "1/4 sec." insert --nitrocellulose-- |
| Column 5, lines 45 and 46 | Change "differences" to --difference-- |
| Column 6, line 7 | Change "powder" to --power-- |
| Column 8, line 45 | Change "aid" to --said-- |
| Column 8, line 47 | Change "stri-like" to --strip-like-- |
| Column 8, line 48 | Change "seies" to --series-- |
| Column 8, line 49 | Change "th" to --the-- |
| Column 8, line 53 | Change "sad" to --said-- |

Signed and Sealed this

*Third* Day of *August 1982*

[SEAL]

*Attest:*

GERALD J. MOSSINGHOFF

*Attesting Officer* *Commissioner of Patents and Trademarks*